US012078608B2

(12) United States Patent
Chan et al.

(10) Patent No.: US 12,078,608 B2
(45) Date of Patent: Sep. 3, 2024

(54) POWER SUPPLY DEVICE WITH PROTECTION FUNCTION WHEN WATER INGRESS OCCURS

(71) Applicant: Acer Incorporated, New Taipei (TW)

(72) Inventors: Tzu-Tseng Chan, New Taipei (TW); Chih-Chiang Chen, New Taipei (TW); Chuan-Jung Wang, New Taipei (TW)

(73) Assignee: Acer Incorporated, New Taipei (TW)

( * ) Notice: Subject to any disclaimer, the term of this patent is extended or adjusted under 35 U.S.C. 154(b) by 127 days.

(21) Appl. No.: 17/958,440

(22) Filed: Oct. 3, 2022

(65) Prior Publication Data
US 2023/0133557 A1 May 4, 2023

(30) Foreign Application Priority Data
Nov. 2, 2021 (TW) .................................. 110140666

(51) Int. Cl.
*G01N 27/22* (2006.01)
(52) U.S. Cl.
CPC .................................. *G01N 27/223* (2013.01)
(58) Field of Classification Search
CPC .............................. G01N 27/223; G01M 3/186
USPC ........................................................ 324/664
See application file for complete search history.

(56) References Cited

U.S. PATENT DOCUMENTS

| 10,801,919 | B2* | 10/2020 | Honjo | G01M 13/045 |
| 2016/0077161 | A1* | 3/2016 | Balogh | G01H 17/00 |
| | | | | 324/764.01 |

FOREIGN PATENT DOCUMENTS

| CN | 106647539 | 5/2017 |
| CN | 110224695 | 9/2019 |
| CN | 112202444 | 1/2021 |

OTHER PUBLICATIONS

Sauer, Sebastian, and Wolf-Joachim Fischer. "A passive wireless humidity threshold monitoring sensor principle based on deliquescent salts and a diffusion based irreversible state change." IEEE Sensors Journal 14.4 (2013): 971-978. (Year: 2013).*

* cited by examiner

Primary Examiner — Christopher P McAndrew
(74) Attorney, Agent, or Firm — JCIPRNET (57) ABSTRACT

A power supply device is provided. The power supply device includes a housing, a power converter, a controller, multiple humidity sensitive capacitors, and a feedback circuit. The housing has multiple joints. The controller controls the power converter to provide an output voltage. The humidity sensitive capacitors are respectively configured in the housing and adjacent to a corresponding joint of the joints. The humidity sensitive capacitors jointly provide a sensing capacitance value. The feedback circuit changes a gain value and a compensation bandwidth of the output voltage in response to the change of the sensing capacitance value. When the humidity of at least one of the joints increases, the sensing capacitance value is reduced, so that the gain value and the compensation bandwidth are reduced.

10 Claims, 5 Drawing Sheets

POWER SUPPLY DEVICE WITH PROTECTION FUNCTION WHEN WATER INGRESS OCCURS

CROSS-REFERENCE TO RELATED APPLICATION

This application claims the priority benefit of Taiwanese application no. 110140666, filed on Nov. 2, 2021. The entirety of the above-mentioned patent application is hereby incorporated by reference herein and made a part of this specification.

BACKGROUND

Technical Field

The disclosure relates to a power supply device, and in particular, to a power supply device with a protection function when a water ingress occurs.

Description of Related Art

In a housing of a conventional power supply device, high-frequency welding ultrasonic bars are adopted for welding. To avoid an appearance defect due to an overflow of ultrasonic bars after welding, conventionally, the ultrasonic bars are separately arranged. However, the design may cause gaps between the ultrasonic bars of the upper housing and the lower housing after welding, which may lead to a safety issue when a water ingress occurs in the power supply device. Therefore, how to provide the power supply device with a protection function when the water ingress occurs in the power supply device has become a research focus for those skilled in the art.

SUMMARY

The disclosure is directed to a power supply device capable of providing a protection function when a water ingress occurs in the power supply device.

The power supply device of the disclosure includes a housing, a power converter, a controller, multiple humidity sensitive capacitors, and a feedback circuit. The power converter, the controller, the humidity sensitive capacitors, and the feedback circuit are respectively configured in the housing. The housing has multiple joints. The controller controls the power converter to provide an output voltage. The multiple humidity sensitive capacitors are respectively configured in the housing and adjacent to a corresponding joint of the joints. The multiple humidity sensitive capacitors jointly provide a sensing capacitance value. The feedback circuit is coupled to the power converter, the controller, and the multiple humidity sensitive capacitors. The feedback circuit changes a gain value and a compensation bandwidth of the output voltage in response to a change of the sensing capacitance value. When humidity of at least one of the multiple joints increases, the sensing capacitance value is reduced, so that the gain value and the compensation bandwidth are reduced.

Based on the above, when the humidity of at least one of the multiple joints increases, the sensing capacitance value is reduced. Therefore, the gain value and the compensation bandwidth are reduced. The voltage value of the output voltage is thus reduced. In this way, in the disclosure, the power supply device is provided with a water ingress protection function.

In order to make the aforementioned features and advantages of the disclosure comprehensible, embodiments accompanied with drawings are described in detail below.

DESCRIPTION OF THE EMBODIMENTS

Some embodiments of the disclosure accompanied with the drawings will now be described in detail. In the reference numerals recited in description below, the same reference numerals shown in different drawings will be regarded as the same or similar elements. These embodiments are only a part of the disclosure and do not disclose all possible implementations of the disclosure. To be more precise, these embodiments are only examples of the appended claims of the disclosure.

Figure 1:
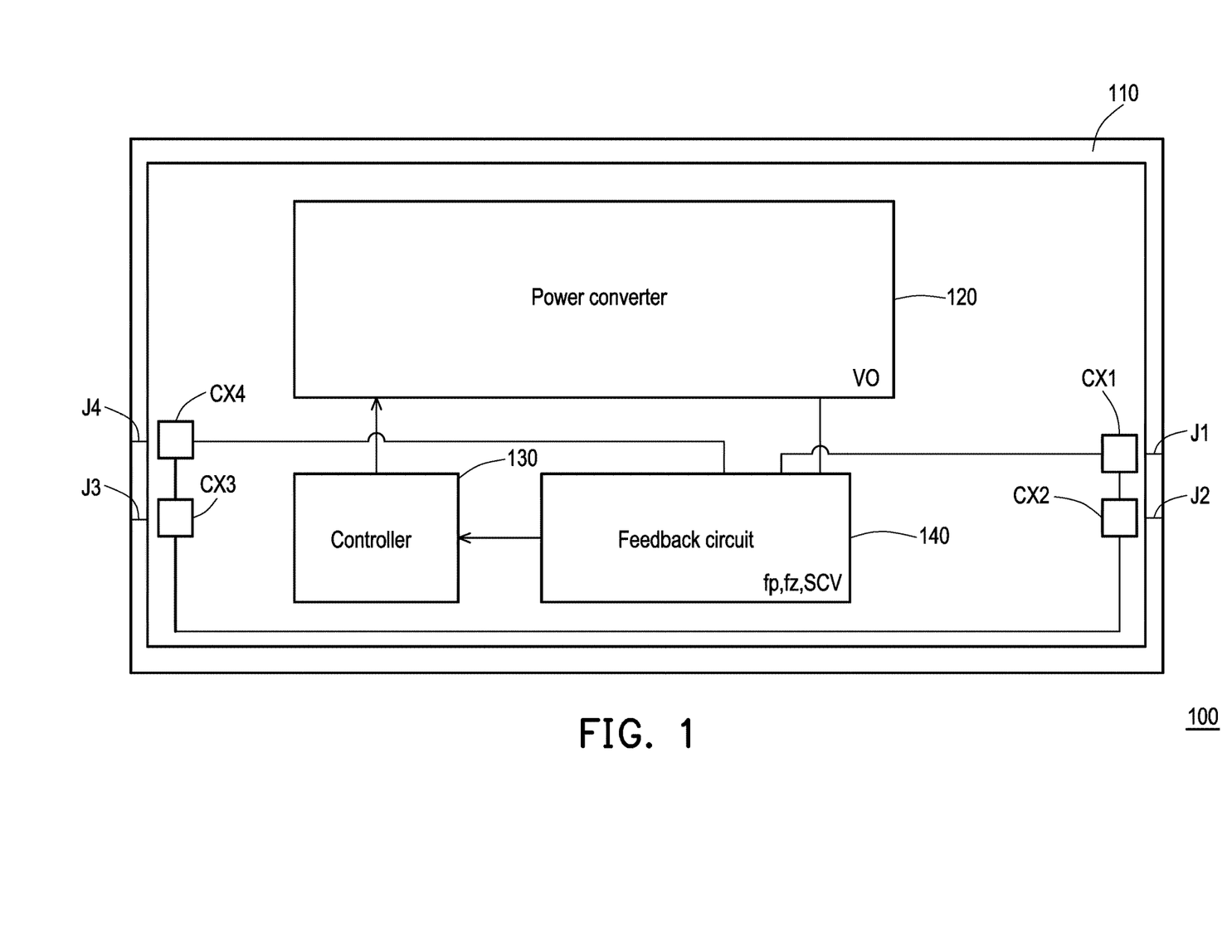
FIG. 1 is a schematic diagram of a power supply device according to a first embodiment of the disclosure.

Referring to FIG. 1, FIG. 1 is a schematic diagram of a power supply device according to a first embodiment of the disclosure. In the embodiment, a power supply device 100 includes a housing 110, a power converter 120, a controller 130, humidity sensitive capacitors CX1 to CX4, and a feedback circuit 140. The power converter 120, the controller 130, the humidity sensitive capacitors CX1 to CX4, and the feedback circuit 140 are respectively configured in the housing 110. The housing 110 has joints J1 to J4. For example, the joints J1 to J4 are respectively a joint of the housing 110 and an AC inlet cable, joints of an upper part of the housing 110 and a lower part of the housing 110, and a joint of the housing 110 and an SR enhancing portion of the transmission cable. The joints J1 to J4 are positions where a water ingress may occur in the power supply device. The controller 130 controls the power converter 120 to provide an output voltage VO.

In the embodiment, the humidity sensitive capacitors CX1 to CX4 are respectively configured in the housing 110. The humidity sensitive capacitors CX1 to CX4 are respectively configured at corresponding joints of the joints J1 to J4 in the housing 110. For example, in the embodiment, the humidity sensitive capacitors CX1 to CX4 are configured one-to-one at the joints J1 to J4. The humidity sensitive capacitor CX1 is designed to be adjacent to the joint J1. The humidity sensitive capacitor CX2 is designed to be adjacent to the joint J2. The rest may be deduced by analogy. In the embodiment, the humidity sensitive capacitors CX1 to CX4 jointly provide a sensing capacitance value SCV. The sensing capacitance value SCV changes in response to humidity (e.g. relative humidity) of the joints J1 to J4. In the embodiment, the humidity sensitive capacitors CX1 to CX4 are coupled in series. Therefore, the sensing capacitance value SCV is approximately a series capacitance provided by the humidity sensitive capacitors CX1 to CX4 coupled in series.

In some embodiments, a number of the humidity sensitive capacitors is greater than a number of the joints. At least two of the humidity sensitive capacitors are designed to be adjacent to the same joint. In the disclosure, the number of and the arrangement of the humidity sensitive capacitors are not limited to this embodiment.

In the embodiment, the feedback circuit 140 is coupled to the power converter 120, the controller 130, and the humidity sensitive capacitors CX1 to CX4. The feedback circuit 140 changes a gain value and a compensation bandwidth of the output voltage VO in response to a change of the sensing capacitance value SCV. When humidity of at least one of the joints J1 to J4 increases, the sensing capacitance value SCV is reduced, so that both of the gain value and the compensation bandwidth are reduced. For example, when the water ingress occurs at the joint J1, a capacitance value of the humidity sensitive capacitor CX1 is reduced. The sensing capacitance value SCV is reduced. Therefore, both of the gain value and the compensation bandwidth of the output voltage VO are reduced. A voltage value of the output voltage VO is reduced. In this way, when the water ingress occurs, the power supply device 100 may have a water ingress protection function.

Specifically, in the embodiment, the feedback circuit 140 provides a pole frequency fp and provides a null frequency fz in response to the change of the sensing capacitance value SCV. The pole frequency fp is greater than the null frequency fz. Therefore, in the embodiment, when the humidity of at least one of the joints J1 to J4 increases, the sensing capacitance value SCV is reduced and the feedback 140 increases the null frequency fz. Both of the gain value and the compensation bandwidth are reduced. In addition, when the humidity of the joints J1 to J4 decreases, the sensing capacitance value SCV is increased and the null frequency fz is reduced. Hence, the gain value and the compensation bandwidth are increased.

Figure 2:
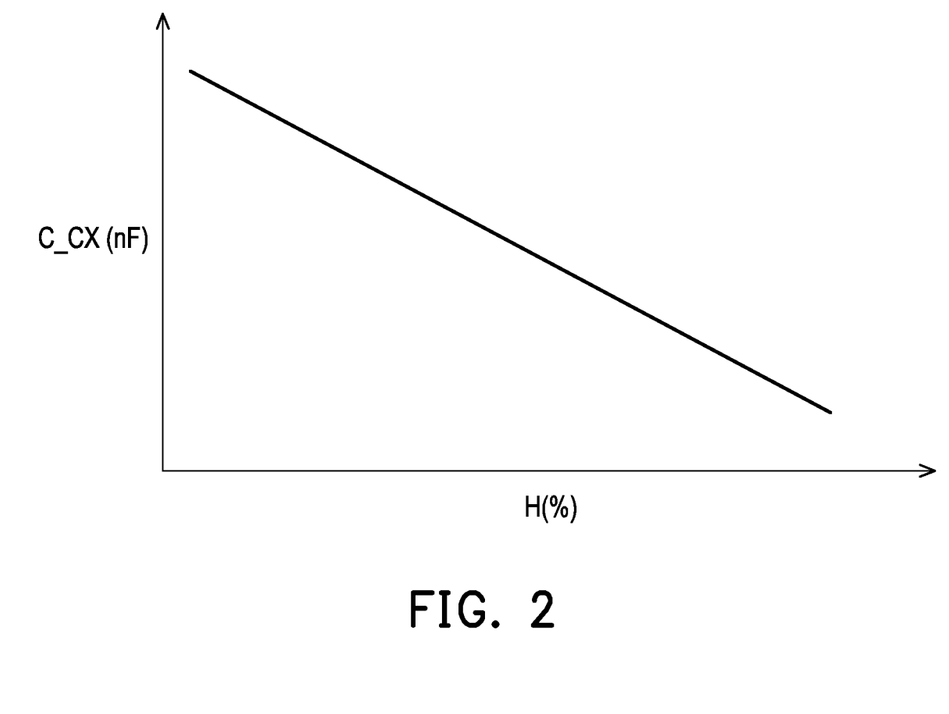
FIG. 2 is a schematic diagram illustrating a relation between a capacitance value of a humidity sensitive capacitor and relative humidity according to an embodiment of the disclosure.

Referring to FIG. 1 and FIG. 2 together, FIG. 2 is a schematic diagram illustrating a relation between a capacitance value of a humidity sensitive capacitor and relative humidity according to an embodiment of the disclosure. In the embodiment, the humidity sensitive capacitors CX1 to CX4 have a capacitance value C_CX. The capacitance value C_CX and relative humidity H are negatively correlated. In the embodiment, the capacitance value C_CX drops linearly based on the relative humidity H. For example, when the relative humidity H at the joint J1 is equal to 0%, the capacitance value C_CX of the humidity sensitive capacitor CX1 adjacent to the joint J1 is equal to 75 nanofarads (nF). When the relative humidity H at the joint J1 is equal to 10%, the capacitance value C_CX of the humidity sensitive capacitor CX1 is equal to 72 nF. When the relative humidity H at the joint J1 is equal to 20%, the capacitance value C_CX of the humidity sensitive capacitor CX1 is equal to 69 nF. The rest may be deduced by analogy.

In some embodiments, the capacitance value C_CX drops nonlinearly based on the relative humidity H. For example, the capacitance value C_CX is inversely proportional to the relative humidity H.

Figure 3:
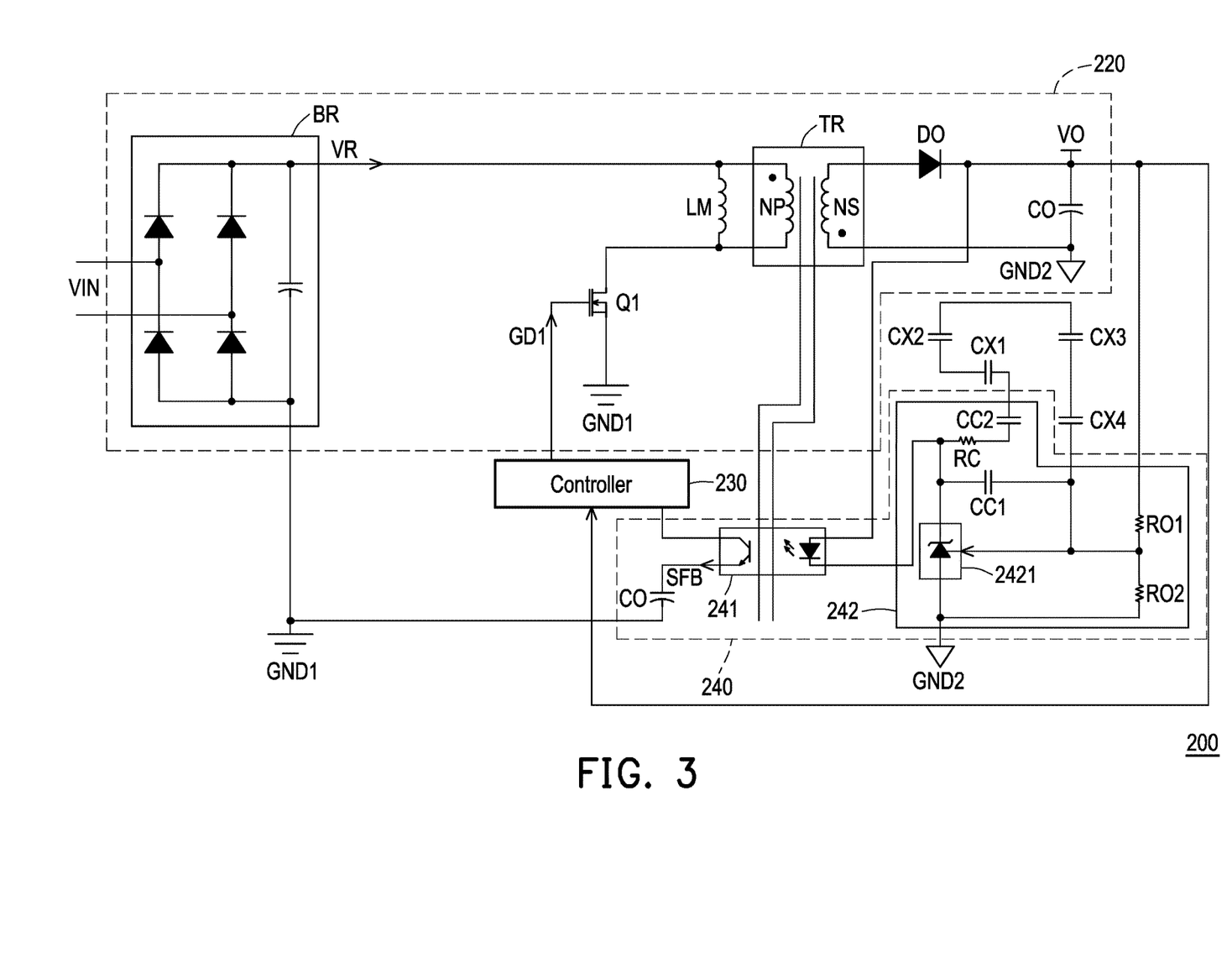
FIG. 3 is a schematic circuit diagram of a power supply device according to a second embodiment of the disclosure.

Referring to FIG. 3, FIG. 3 is a schematic circuit diagram of a power supply device according to a second embodiment of the disclosure. For ease of description, the housing is not shown in the embodiment. In the circuit topology of the embodiment, a power supply device 200 includes a power converter 220, a controller 230, the humidity sensitive capacitors CX1 to CX4, and a feedback circuit 240. The feedback circuit 240 includes a coupling circuit 241 and a voltage regulator circuit 242. The coupling circuit is coupled to the controller 230. The voltage regulator circuit 242 is coupled to the coupling circuit 241, the power converter 220, and the humidity sensitive capacitors CX1 to CX4. The voltage regulator circuit 242 causes the coupling circuit 241 to provide a feedback signal SFB according to a change of the output voltage VO. The controller 230 regulates a frequency of a control signal GD1 according to the feedback signal SFB to stabilize the voltage value of the output voltage VO.

In the embodiment, the voltage regulator circuit 242 includes a voltage regulator 2421 and voltage dividing resistors RO1 and RO2. A first end of the voltage regulator 2421 is coupled to the coupling circuit 241. A second end of the voltage regulator 2421 is coupled to a reference low voltage that is a grounding end GND2. A reference end of the voltage regulator 2421 is configured to provide a reference value R. The voltage regulator 2421 causes the coupling circuit 241 to provide the feedback signal SFB according to the change of the output voltage VO. The voltage dividing resistor RO1 is coupled between an output end of the power converter 220 and the reference end of the voltage regulator 2421. The voltage dividing resistor RO2 is coupled between the reference end of the voltage regulator 2421 and the second end of the voltage regulator 2421. The voltage regulator 2421 may be realized by an element TL431.

The coupling circuit 241 may be realized by a photocoupler (e.g. an element PC817). The coupling circuit 241 includes a light-emitting diode and a coupling transistor. An anode of the light-emitting diode is coupled to the output voltage VO. A cathode of the light-emitting diode is coupled to the first end of the voltage regulator 2421. The coupling transistor is coupled between the controller 230 and a grounding end GND1. In the embodiment, the voltage dividing resistors RO1 and RO2 divide the voltage value of the output voltage VO to obtain a divided voltage value of the output voltage VO. The voltage regulator 2421 receives the divided voltage value and compares the divided voltage value and the reference value R. When the divided voltage value and the reference value R are different, a voltage value of the first end of the voltage regulator 2421 changes to affect a light-emitting result of the light-emitting diode. Therefore, the feedback signal SFB generated by the coupling transistor also changes. The controller 230 regulates the frequency of the control signal GD1 based on a charging result caused by the feedback signal SFB to stabilize the voltage value of the output voltage VO.

For example, the feedback circuit 240 further includes a capacitor CB. When the voltage value of the output voltage VO increases, the divided voltage value received by the voltage regulator 2421 increases. Therefore, the voltage value of the first end of the voltage regulator 2421 is correspondingly reduced. A brightness of the light-emitting diode increases. Therefore, a current value of the feedback signal SFB provided by the coupling transistor increases so that a charging result of the capacitor CB is affected. The controller 230 reduces an operation period of the control signal GD1 according to the charging result of the capacitor CB. Therefore, the voltage value of the output voltage VO is reduced. Conversely, when the voltage value of the output voltage VO decreases, the controller 230 increases the operation period of the control signal GD1. Therefore, the voltage value of the output voltage VO is increased. Therefore, the voltage value of the output voltage VO may be stabilized.

In the embodiment, the voltage regulator circuit 242 further includes compensation capacitors CC1 and CC2, and a compensation resistor RC. The compensation capacitor CC1 is coupled between the reference end of the voltage regulator 2421 and the first end of the voltage regulator 2421. The compensation capacitor CC2, the compensation resistor RC, and the humidity sensitive capacitors CX1 to CX4 are coupled in series to form an element series. The element series is coupled between the reference end of the voltage regulator 2421 and the first end of the voltage regulator 2421. In the embodiment, the pole frequency (the pole frequency fp shown in FIG. 1) is determined according to a capacitance value of the compensation capacitor CC1 and a resistance value of the compensation resistor RC. Since the capacitance value of the compensation capacitor CC1 and the resistance value of the compensation resistor RC are not changed, the pole frequency is constant. The pole frequency may be determined through $$fp = \frac{1}{2 \times \pi \times R\_RC \times C\_CC1} \qquad \text{Equation (1)}$$

In Equation (1), fp represents the pole frequency. R_RC represents the resistance value of the compensation resistor RC. C_CC1 represents the capacitance value of the compensation capacitor CC1.

The null frequency (the null frequency fz shown in FIG. 1) is determined according to a capacitance value of the compensation capacitor CC2, the resistance value of the compensation resistor RC, and the sensing capacitance value provided by the humidity sensitive capacitors CX1 to CX4. Note that the sensing capacitance value may change, so the null frequency may change based on the change of the sensing capacitance value. The null frequency may be determined through Equations (2) and (3).

$$fz = \frac{1}{2 \times \pi \times R\_RC \times CT} \qquad \text{Equation (2)}$$

$$CT = \frac{1}{\frac{1}{C\_CC2} + \frac{1}{C\_CX1} + \frac{1}{C\_CX2} + \frac{1}{C\_CX3} + \frac{1}{C\_CX4}} \qquad \text{Equation (3)}$$

In Equations (2) and (3), fz represents the null frequency. R_RC represents the resistance value of the compensation resistor RC. C_CC2 represents the capacitance value of the compensation capacitor CC2. C_CX1 represents the capacitance value of the humidity sensitive capacitor CX1. C_CX2 represents a capacitance value of the humidity sensitive capacitor CX2. C_CX3 represents a capacitance value of the humidity sensitive capacitor CX3. C_CX4 represents a capacitance value of the humidity sensitive capacitor CX4. CT represents a capacitance value formed by the compensation capacitor CC2 and the humidity sensitive capacitors CX1 to CX4 coupled in series. In other words, the capacitance value CT is approximately equal to a result of the sensing capacitance value and the capacitance value of the compensation capacitor CC2 in series.

In the embodiment, when the relative humidity is equal to 0%, the humidity sensitive capacitors CX1 to CX4 are designed to have the capacitance values that are less than or equal to the capacitance value of the compensation capacitor CC2. In addition, the capacitance value of the compensation capacitor CC1 is less than the capacitance value CT.

Figure 4:
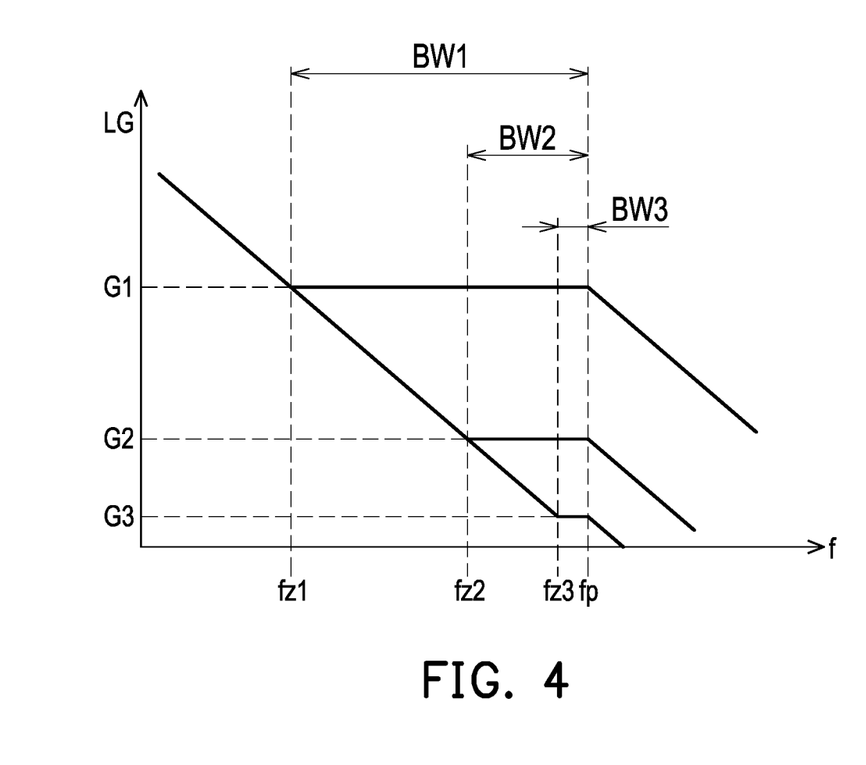
FIG. 4 is a schematic diagram of loop gain in multiple humidity states according to an embodiment of the disclosure.

To further explain, referring to FIG. 3 and FIG. 4 together, FIG. 4 is a schematic diagram of loop gain in multiple humidity states according to an embodiment of the disclosure. FIG. 4 illustrates loop gain LG in various humidity states. In the embodiment, when the relative humidity is equal to 0%, the water ingress does not occur in the power supply device 200. The feedback circuit 240 provides a null frequency fz1 and the pole frequency fp. Therefore, a gain value G1 and a compensation bandwidth BW1 are formed.

When a slight water ingress occurs in the power supply device 200, the sensing capacitance value drops. The feedback circuit 240 provides a null frequency fz2 and the pole frequency fp. Therefore, a gain value G2 and a compensation bandwidth BW2 are formed. Note that the null frequency fz2 is greater than the null frequency fz1. Therefore, the gain value G2 is less than the gain value G1. Since the pole frequency fp is not changed, the compensation bandwidth BW2 is less than the compensation bandwidth BW1.

For example, based on the gain value G1, the power converter 220 may provide the output voltage VO. The voltage value of the output voltage VO is approximately equal to 19 volts (the disclosure is not limited thereto). In addition, based on the compensation bandwidth BW1, the output voltage VO has a greater compensation margin and stability. When the slight water ingress occurs in the power supply device 200, the loop gain LG drops from the gain value G1 to the gain value G2. Therefore, based on the gain value G2, the voltage value of the output voltage VO is reduced to 5 volts. In addition, based on the compensation bandwidth BW2, the compensation margin of the output voltage VO may be reduced.

When a severe water ingress occurs in the power supply device 200, the sensing capacitance value drops further. The feedback circuit 240 provides a null frequency fz3 and the pole frequency fp. Therefore, a gain value G3 and a compensation bandwidth BW3 are formed. Note that the null frequency fz3 is greater than the null frequency fz2. Therefore, the gain value G3 is less than the gain value G2. Since the pole frequency fp is not changed, the compensation bandwidth BW3 is less than the compensation bandwidth BW2.

For example, when the severe water ingress occurs in the power supply device 200, the gain value drops to the gain value G3. Therefore, based on the gain value G3, the voltage value of the output voltage VO is reduced to less than 5 volts (e.g. approximately 0 volts). In addition, based on the compensation bandwidth BW3, the compensation margin of the output voltage VO is very small so that the output voltage VO cannot be reduced to 0 volts by the gain value.

In the embodiment, the null frequency fz2 may be designed to be greater than or equal to 1.5 times the null frequency fz1 and less than the null frequency fz3. The null frequency fz3 may be designed to be greater than or equal to 2 times the null frequency fz1 and slightly less than the pole frequency fp.

Returning to the embodiment in FIG. 3, the power converter 220 includes a rectifier BR, an excitation inductor LM, a transformer TR, a power switch Q1, an output diode DO, and an output capacitor CO. The rectifier BR generates a rectified power VR according to an input voltage VIN. A first end of the excitation inductor LM is coupled to the rectifier BR. A first end of the power switch Q1 is coupled to a second end of the excitation inductor LM. A second end of the power switch Q1 is coupled to the grounding end GND1. A control end of the power switch Q1 is coupled to the controller 230. The transformer TR includes a primary winding NP and a secondary winding NS. The primary winding NP is coupled to the excitation inductor LM in parallel. A first end of the secondary winding NS is coupled to an anode of the output diode DO. A second end of the secondary winding NS is coupled to the grounding end GND2. A cathode of the output diode DO serves as the output end of the power converter 220. The output capacitor CO is coupled between the cathode of the output diode DO and the grounding end GND2. The power switch Q1 performs switch operation based on the control signal GD1 provided by the controller 230 so that the power converter 220 converts the rectified power VR into the output voltage VO.

In the embodiment, the topology of the rectifier BR and a flyback converter serves as an example of the power converter 220; however, the disclosure is not limited thereto. In some embodiments, the power converter 220 may be realized by other converters.

Figure 5:
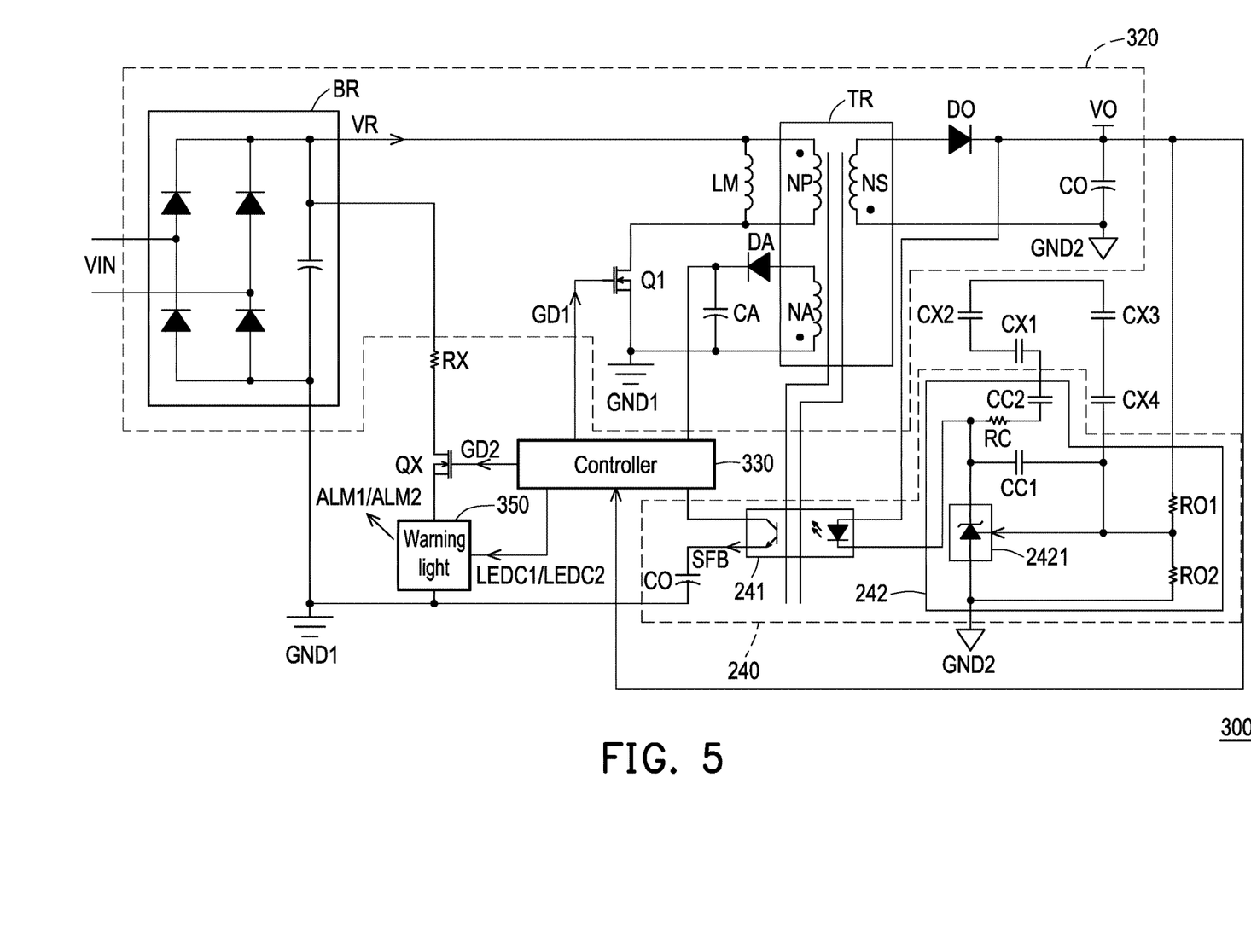
FIG. 5 is a schematic diagram of a power supply device according to a third embodiment of the disclosure.

Referring to FIG. 4 and FIG. 5, FIG. 5 is a schematic circuit diagram of a power supply device according to a third embodiment of the disclosure. In the embodiment, a power supply device 300 includes a power converter 320, a controller 330, humidity sensitive capacitors CX1 to CX4, the feedback circuit 240, a warning power switch QX, and a warning light 350. The implementation of the feedback circuit 240 and humidity sensitive capacitors CX1 to CX4 is clearly described in the embodiments of FIG. 1 to FIG. 4, and it is not repeated. In the embodiment, a first end of the warning power switch QX receives the rectified power VR. A control end of the warning power switch QX is coupled to the controller 330. The warning light 350 is coupled to a second end of the warning power switch QX and the controller 330. The rectified power VR serves as a driving power of the warning light 350.

In the embodiment, the controller 330 receives the output voltage VO to determine an internal humidity state of the housing (the housing 110 as shown in FIG. 1) according to the voltage value of the output voltage VO. In addition, the controller 330 controls the warning power switch QX and the warning light 350 based on the humidity state so that the warning light 350 displays warning signals ALM1 and ALM2 corresponding to different humidity states.

In the embodiment, to protect the warning power switch QX and the warning light 350, a current-limiting resistor RX may be provided between the first end of the warning power switch QX and the rectifier BR of the power converter 320.

In the embodiment, based on a performance of the loop gain LG shown in FIG. 4, the voltage value of the output voltage VO is controlled to be approximately 19 volts based on the gain value G1. The voltage value of the output voltage VO is controlled to be approximately 5 volts based on the gain value G2. The voltage value of the output voltage VO is controlled to be approximately 0 volts based on the gain value G3. When the voltage value of the output voltage VO is approximately equal to an operation voltage value (i.e. 19 volts), the controller 330 determines a first humidity state inside the housing. The first humidity state is a state where no water ingress occurs. When the voltage value of the output voltage VO is approximately equal to a first voltage value (i.e. 5 volts), the controller 330 determines a second humidity state inside the housing. The second humidity state is a state where the slight water ingress occurs. When the voltage value of the output voltage VO is approximately equal to a second voltage value (i.e. 0 volts), the controller 330 determines a third humidity state inside the housing. The third humidity state is a state where the severe water ingress occurs.

In the embodiment, in the first humidity state, the controller 330 turns off the warning power switch QX. Therefore, the warning light 350 stops operating since it cannot receive the rectified power VR. In the second humidity state, the controller 330 provides a control signal GD2 to turn on the warning power switch QX and controls the warning light 350 to display the warning signal ALM1. Specifically, in the second humidity state, the controller 330 turns on the warning power switch QX and provides a control signal LEDC1. The warning light 350 displays the warning signal ALM1 in response to the control signal LEDC1.

In the third humidity state, the controller 330 provides the control signal GD2 to turn on the warning power switch QX and controls the warning light 350 to display the warning signal ALM2. Specifically, in the third humidity state, the controller 330 turns on the warning power switch QX and provides a control signal LEDC2. The warning light 350 displays the warning signal ALM2 in response to the control signal LEDC2.

In the embodiment, a color of the warning signal ALM1 is different from a color of the warning signal ALM2. For example, the color of the warning signal ALM1 may be yellow. In the second humidity state, the color of the warning signal ALM2 may be red. In some embodiments, a blinking pattern of the warning signal ALM1 is different from a blinking pattern of the warning signal ALM2.

In the embodiment, the warning light 350 may be realized by at least one light-emitting diode module or light-emitting element. The warning light 350 is disposed on the housing or an output cable. In this way, a user may obtain the humidity state inside the housing from an outside of the housing.

In the embodiment, the difference between the power converter 320 and the power converter 220 is that the power converter 320 further includes an auxiliary diode DA and an auxiliary capacitor CA. The transformer TR further includes an auxiliary winding NA. The auxiliary diode DA, the auxiliary capacitor CA, and the auxiliary winding NA jointly form an auxiliary power supplier. A first end of the auxiliary winding NA is coupled to an anode of the auxiliary diode DA. A cathode of the auxiliary diode DA is coupled to a first end of the auxiliary capacitor CA and the controller 330. A second end of the auxiliary capacitor CA is coupled to a second end of the auxiliary winding NA and the grounding end GND1. The auxiliary power supplier may provide an auxiliary power to the controller 330.

In summary of the above, when the humidity of at least one of the multiple joints of the housing of the power supply device increases, the gain value and the compensation bandwidth of the output voltage are reduced. Therefore, the voltage value of the output voltage is reduced. In this way, in the disclosure, the power supply device is provided with a water ingress protection function. In addition, in some embodiments, the power supply device includes the warning light. The power supply device may control the warning light to display the different warning signals corresponding to the humidity states according to the humidity states. In this way, the user may obtain the humidity state inside the housing based on the warning signal.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:
1. A power supply device, comprising:
a housing having a plurality of joints;
a power converter configured in the housing;

a controller configured in the housing and configured to control the power converter to provide an output voltage;

a plurality of humidity sensitive capacitors respectively configured in the housing and adjacent to a corresponding joint of the joints and jointly providing a sensing capacitance value; and a feedback circuit configured in the housing, coupled to the power converter, the controller, and the humidity sensitive capacitors, and configured to change a gain value and a compensation bandwidth of the output voltage in response to a change of the sensing capacitance value, wherein in response to humidity of at least one of the joints increasing, the sensing capacitance value is reduced and the gain value and the compensation bandwidth are thus reduced.

2. The power supply device according to claim 1, wherein the sensing capacitance value is a series capacitance provided by the humidity sensitive capacitors connected in series.

3. The power supply device according to claim 1, wherein:

the feedback circuit provides a pole frequency and provides a null frequency in response to the change of the sensing capacitance value, the pole frequency is greater than the null frequency, and in response to the humidity of at least one of the joints increasing, the sensing capacitance value is reduced, the null frequency is increased, and the gain value and the compensation bandwidth are thus reduced.

4. The power supply device according to claim 3, wherein the feedback circuit comprises:

a coupling circuit coupled to the controller; and a voltage regulator circuit coupled to the coupling circuit, the power converter, and the humidity sensitive capacitors and configured to cause the coupling circuit to provide a feedback signal according to a change of the output voltage, wherein the controller stabilizes a voltage value of the output voltage by regulating a frequency of a control signal according to the feedback signal.

5. The power supply device according to claim 4, wherein the voltage regulator circuit comprises:

a voltage regulator, wherein a first end of the voltage regulator is coupled to the coupling circuit, a second end of the voltage regulator is coupled to a reference low voltage, a reference end of the voltage regulator is configured to provide a reference value, the voltage regulator is configured to cause the coupling circuit to provide the feedback signal according to the change of the output voltage;

a first voltage dividing resistor coupled between an output end of the power converter and the reference end of the voltage regulator;

a second voltage dividing resistor coupled between the reference end of the voltage regulator and the second end of the voltage regulator;

a first compensation capacitor coupled between the reference end of the voltage regulator and the first end of the voltage regulator;

a compensation resistor; and a second compensation capacitor coupled in series to the compensation resistor and the humidity sensitive capacitors between the reference end of the voltage regulator and the first end of the voltage regulator.

6. The power supply device according to claim 5, wherein:

the pole frequency is determined according to a capacitance value of the first compensation capacitor and a resistance value of the compensation resistor, and the null frequency is determined according to a capacitance value of the second compensation capacitor, the resistance value of the compensation resistor, and the sensing capacitance value.

7. The power supply device according to claim 3, wherein the controller determines an internal humidity state of the housing according to a voltage value of the output voltage.

8. The power supply device according to claim 7, wherein:

in response to the voltage value of the output voltage being approximately equal to an operation voltage value, the controller determines a first humidity state inside the housing, in response to the voltage value of the output voltage being approximately equal to a first voltage value, the controller determines a second humidity state inside the housing, in response to the voltage value of the output voltage being approximately equal to a second voltage value, the controller determines a third humidity state inside the housing, the first voltage value is less than the operation voltage value, and the second voltage value is less than the first voltage value.

9. The power supply device according to claim 8, wherein:

the power converter comprises:

a rectifier configured to provide a rectified power, the power supply device comprises:

a warning power switch, wherein a first end of the warning power switch receives the rectified power, and a control end of the warning power switch is coupled to the controller; and a warning light coupled to a second end of the warning power switch and the controller.

10. The power supply device according to claim 9, wherein:

the controller turns off the warning power switch based on the first humidity state, the controller turns on the warning power switch and controls the warning light to display a first warning signal based on the second humidity state, the controller turns on the warning power switch and controls the warning light to display a second warning signal based on the third humidity state.

* * * * *